Sept. 8, 1959     H. G. TWIFORD     2,903,029
TIRE HOLDING TABLE
Filed July 11, 1955     3 Sheets-Sheet 1
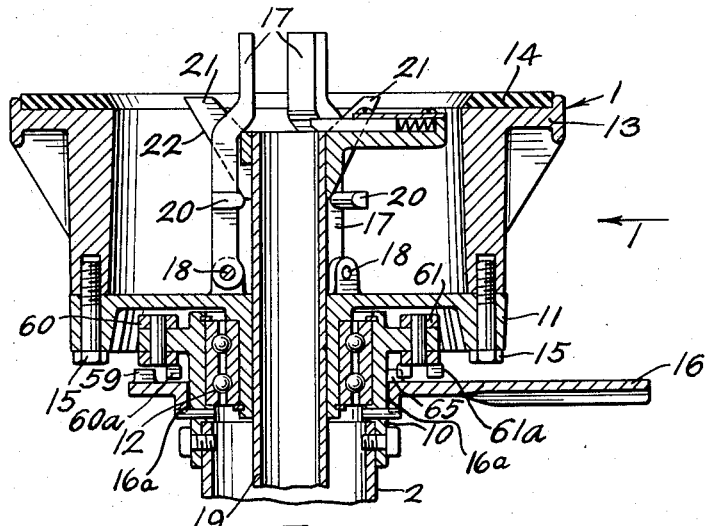
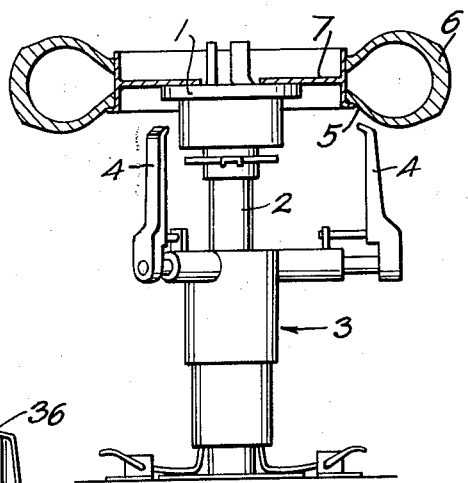
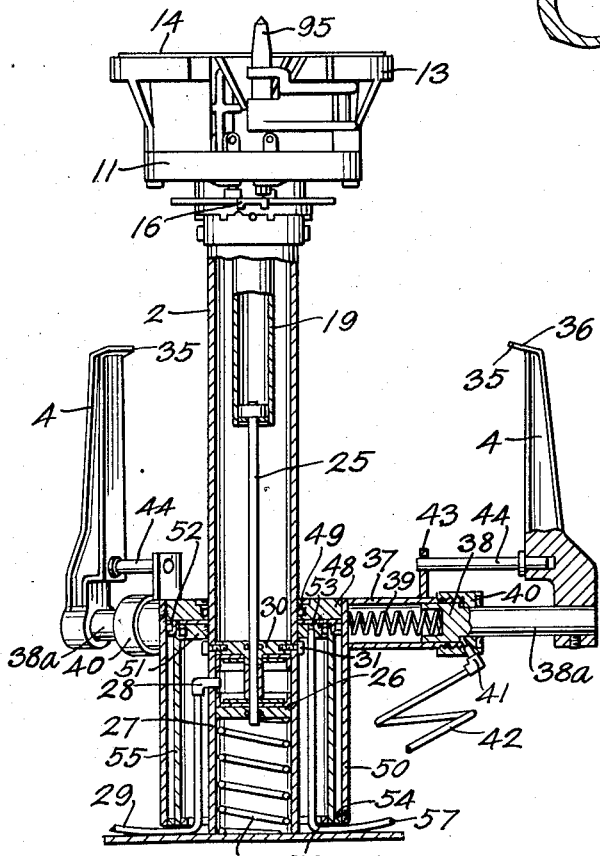
INVENTOR.
HARRY G. TWIFORD
BY
ATTORNEYS

INVENTOR.
HARRY G. TWIFORD
BY
ATTORNEYS

Sept. 8, 1959 H. G. TWIFORD 2,903,029
TIRE HOLDING TABLE
Filed July 11, 1955 3 Sheets-Sheet 3

INVENTOR.
HARRY G. TWIFORD
BY
ATTORNEYS

United States Patent Office 2,903,029
Patented Sept. 8, 1959

2,903,029

TIRE HOLDING TABLE

Harry G. Twiford, Denver, Colo.

Application July 11, 1955, Serial No. 521,129

5 Claims. (Cl. 144—288)

This invention relates to tire changing equipment and more particularly to wheel holding tables and tire removal means associated with the tables for large sizes of vehicle wheels.

Conventional service station tire changing equipment is designed and manufactured for passenger automobile wheels, and cannot effectively accommodate large truck wheels. Since the standard automobile tire changing equipment will not handle the truck tires, the operator must use an undue amount of physical exertion to change the tires of the truck wheels. The majority of truck wheels in the larger sizes are not of the drop rim type so that an entirely different set of problems is encountered in changing the truck tires, and a different type of tire changing equipment is necessary for efficient handling of the truck tires.

Included among the objects and advantages of the present invention is to provide an improved wheel holding table including fluid motor actuated means for releasably securing a wheel in operative position on a substantially horizontal table, and means for pushing a held pneumatic tire from the wheel. The operating mechanism of the tire removing device is actuated by a fluid motor to minimize the physical exertion of the operator, and to provide an efficient and easily operated tire changer. The wheel holding table is provided for one way rotation in either direction and a lock position for the most effective operation of the device. Wheel clamp down means for the tire holding table is provided which permits the use of an efficient central tool support.

These and other objects and advantages of the invention may be readily ascertained by referring to the following description and appended illustrations in which:

Fig. 1 is a side elevational view of a tire changing device according to the invention;

Fig. 2 is a cross sectional elevation showing the details of construction of the holding table and table rotating mechanism of Fig. 1;

Fig. 3 is a side elevation of the device of Fig. 1 showing in detail the construction of the tire removing means;

Figure 4:
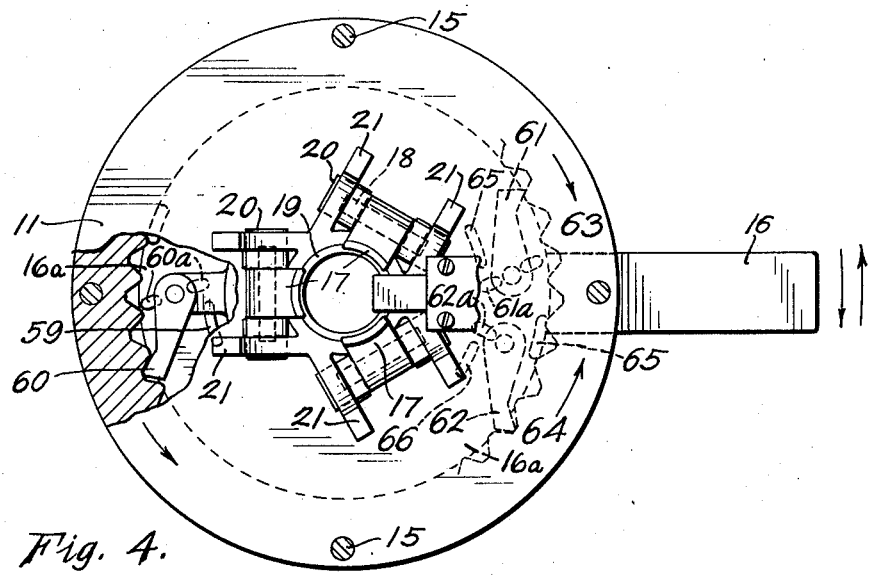
Fig. 4 is a top plan view in partial section of the wheel holding table showing the ratchet system for the rotation of the table.

In the device illustrated in Figs. 1 through 3 inclusive, a wheel holding table shown in general by numeral 1 is mounted on a support 2 which is secured to a floor surface in substantial upright position. A tire removal means, indicated in general by numeral 3, includes three equally spaced tire contacting members 4 which are adapted to contact the lower bead 5 of a held tire 6 mounted on a wheel 7. The wheel is mounted in operative position on the table 1. The wheel holding table, illustrated in detail in Fig. 2, comprises a base 10 which is secured to the mount 2 and a rotatable table support 11 mounted for rotation on the base 10 by means of roller bearings 12 spaced therebetween. A table 13 is secured to the table support 11 by means of bolts 15 peripherally spaced therearound. A rubber or soft plastic face 14 is provided on the table 11 to prevent scratching or damage to the wheel mounted thereon. A ratchet and pawl arrangement interconnected to lever handle 16 controls the rotation of the table, explained below in detail.

Three bifurcate jaws 17 are mounted on pivots 18 integral with member 11 and placed at 120 degrees apart around a central tube 19. The jaws 17 are pivoted on pivots 18 so as to move laterally outward along a radius away from the central portion of the table. A lateral brace 20 is provided on each bifurcate form of the jaws 17. A cam extension 21 is mounted on the tube 19 and is arranged to extend through the openings in the jaws 17, and a cam surface 22 is in contact with the brace 20. As the tube 29 is pulled downwardly the cam extension 21 is likewise pulled downwardly and the brace 21 rides along the cam surface 22 forcing the jaw 17 outwardly into clamping relation with a wheel mounted on the table. The tube 19 is pulled downwardly by means of a connecting rod 25 (Fig. 3) which is interconnected with a piston 26. The piston 26 is mounted in a cylinder 27 having an air inlet means 28 supplied by a conduit 29. The head 30 is secured in the cylinder by means of bolts 31, so that when air is introduced through inlet 28 the piston 26 is forced downwardly against a spring 32 pulling the tube 19 downwardly. In the preferred practice, the air conduit 29 is controlled by a foot valve (not shown) and on releasing the valve the air from the cylinder passes back out through the conduit 29 and the spring 32 forces the piston upwardly releasing the cam surfaces on the braces 20 and permitting the jaws 17 to move back into released position.

The tire removal means includes an inwardly extending portion 35 on the tire contacting jaw 4, which is arranged at an angle to pass between the receiving groove of the wheel and the bead of a tire so the bead rests on the bead contacting surface 36. Each of the members 4 are mounted on a cylinder 37 which has a piston 38 mounted therein abutting against a spring 39. The jaw 4 is interconnected with the piston 38 by means of piston rod 38a, and when air is introduced between the piston 38 and a cylinder head 40, the jaw is moved inwardly against the spring tension of spring 39.

Air is introduced in between the piston 38 and the cylinder head 40 through an inlet 41 which is supplied by means of a conduit 42. The conduit 42 is preferably controlled by means of a foot valve so that the operator's hands are free to manipulate the tire on the table. The foot valves are common items of commerce and do not require detailed description. The jaw 4 is maintained in upright position by means of a support 43 mounted on the cylinder 37 and interconnected with the jaw by means of a connecting rod 44.

The jaw is moved upwardly by means of an expanding fluid motor which operates on the support 2, and comprises a first pusher head 48 reciprocally mounted on the tube 2 and sealed thereto by means of O-ring seals 49. The head 48 is secured to a large tube 50 as by welding, and the like, forming a tight seal therebetween. An annular cylinder head 51 is secured to the tube 2, but is reciprocally sealed on the internal surface of a tube 55. An air inlet 53 provides air under pressure to be introduced in the space between the head 48 and the head 51 causing the head 48 to rise. The inner head 51 provides a stationary base against which the air exerts pressure to move the head 48 upwardly. The tube 50 moves upwardly under the influence of the air under pressure until the stop 54 which is secured to the inner surface of the tube 50 contacts an annular head 52 which is secured to tube 55 and is reciprocally sealed on the inner surface of tube 50. On contacting the head 52 by stop 54 the inner tube 55 rises forming in effect an extension of tube 50. The tube 55 can move upwardly until its stop 56 contacts the head 51. The air is supplied into inlet 53 by means of a conduit 57, which is preferably controlled by means of a foot valve, not shown. The extended height of the tubes 50 and 55 move the jaws 4 well above the top of the table 14, so as to push any tire clear of its mounting wheel.

The ratchet and pawl is shown in detail in Fig. 4 in which the handle 16 mounted on ring 16a controls a pawl 60 (rotatably mounted on an extension of base 10) which permits rotation of the table in the direction shown by arrow 64. Forward pawls 61 and 62 (rotatably mounted on extensions of base 10), also control the rotation and when the handle 16 is in centered position, as indicated with all the pawls in engagement with the ratchet teeth of the table, the wheel table will be held locked against any rotation. When the handle 16 is moved clockwise along the downwardly pointed arrow the pawl 61 is moved out of the ratchet teeth by means of throw 65 (mounted on ring 16a) contacting pawl extension 61a, so that the table can rotate in the direction of the arrow pointed toward 63, but not in the direction of the arrow 64. At the same time pawl 60 is thrown out of contact with the ratchet by means of throw 59 (mounted on ring 16a) contacting pawl extension 60a, so that the table will move in a direction of the arrow 63. Also, when the handle is moved counterclockwise, the throw 66 (mounted on ring 16a) moves pawl 62 out of contact with the teeth of the ratchet so that the table will rotate counterclockwise in the direction of arrow 64. In changing a tire, is is important to be able to rotate the table or to hold it steady so that various operations on the tire can be performed without the operator moving around the table to his disadvantage.

Figure 5:
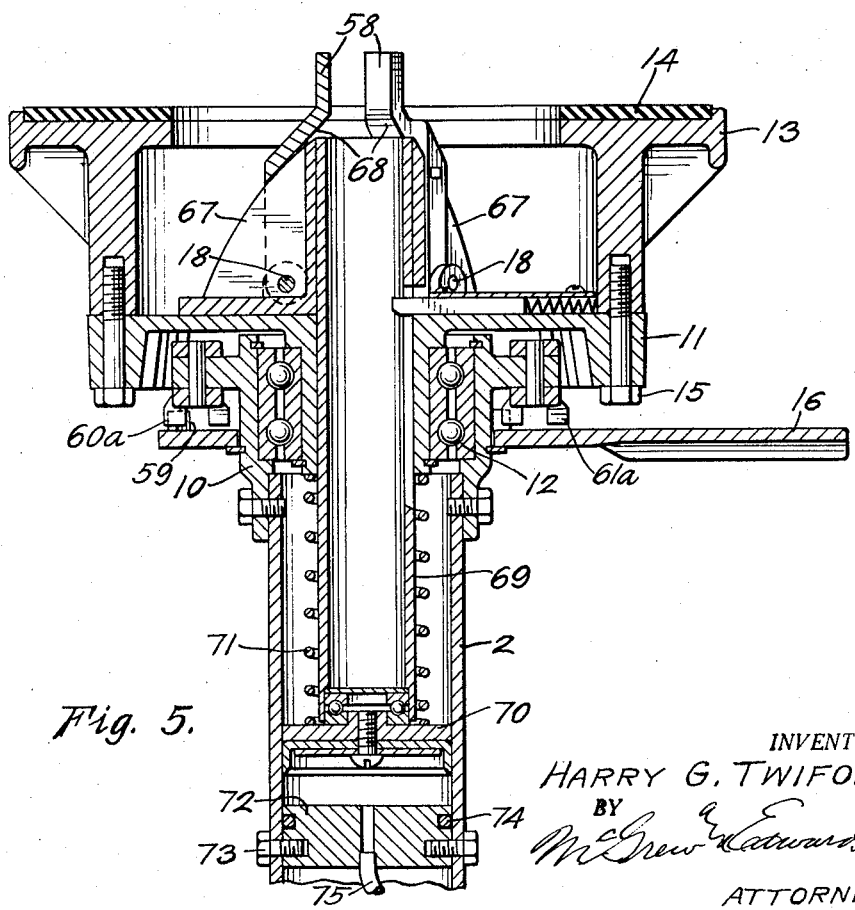
Fig. 5 is a cross sectional view of the details of construction of a modified tire clamp down means.

In the modified device illustrated in Fig. 5, the table base 10 is mounted on the tube 2 in the manner of Figs. 1 to 3. Bifurcated jaws 58 are mounted on pivotal axes 18, and cams 67 are moved upwardly against the inner surface 68 of the jaws 58, which forces the jaws outwardly into holding relation with a wheel. The cams 67 are secured to a short tube 69 which is secured at its lower end on a piston 70. A spring 71 interposed between the piston 70 and the table support 11 tends to move the piston downwardly and the cams 67 back into lowermost position so that the jaws 17 move back into released positon. A cylinder head 72 is secured in the tube by means of bolts 73, and an O-ring seal 74 seals the tube to provide a fluid motor for activating the cams 67. Air under pressure is introduced into the cylinder by means of a conduit 75, controlled by a foot valve, not shown. Air introduced into the cylinder moves the cams 67 upwardly forcing the jaws 58 outwardly into contact with the edge of the wheel hub hole. On release of the air, the spring moves the piston 70 downwardly into inoperative position.

Figure 6:
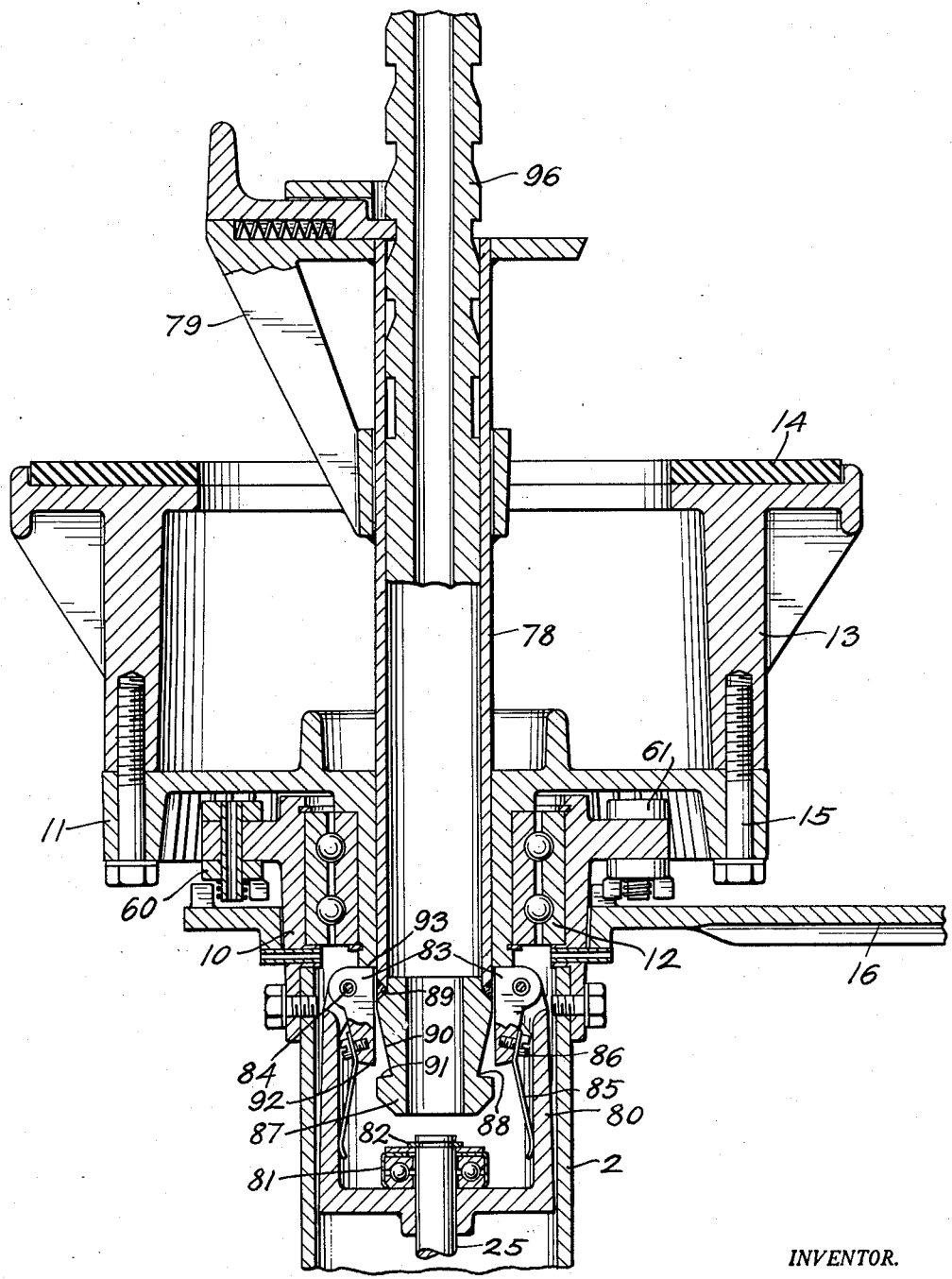
Fig. 6 is a cross sectional view of a table and clamp down mechanism of still another modified device according to the invention.

In the modified form of Fig. 6, the table base 10 is secured to the tube 2, and the table support 11 is rotatably mounted therein. In this case, a center post 78 on which is mounted a clamp down cone 79 is arranged to telescope with the table and near the end of the center post there is provided means to coact with a clamping member. The clamping member includes a pawl ring 80 secured to the end of the rod 25 by means of a ball bearing joint 81 and a retaining ring 82. The ball bearing assembly permits free rotation of the pawl ring and of the center post when the latter is engaged by said pawl ring. Mounted on the ring 80 is a series of clamping pawls 83 which are pivoted by means of axes 84 on the ring 80. On each of the pawls is mounted a spring 85, secured by means of a bolt 86, which tends to push the pawl 83 inwardly, or away from the ring 80. A clamp down tip 87 having an annular groove 88 adjacent the end thereof is welded or otherwise secured onto the end of the center post at 89. The groove 88 has an elongated slanting surface 90 extending upwardly from a substantially horizontal surface 91. The surface 91 is arranged to engage the end surface 92 of the pawls 83, and securely hold the center post 78. As the rod 25 and its attached ring 80 is pulled down under the influence of air against the piston 26, the pawls 83 move away from the edge 93 to permit their pivoting about their axes 84, and under the influence of the springs 85, snap into the surface 90. Further downward movement of the tube permits the pawl surfaces 92 to engage surface 91 securely holding the center post in the retaining ring 80. Further movement of the rod 25 draws the clamp down cone 79 against the edge of the hub hole of a retained wheel.

In the operation of the device, a wheel 7 is placed on the top surface 14 of the table and a lug tip 95 secured to the table is arranged to telescope with a lug hole for preventing relative movement of the wheel in relation to the table. With the device of Fig. 2, the hub hole of the wheel telescopes over the clamp down jaws 17, and on introducing air into the fluid motor against piston 25 the tube 19 is drawn downwardly, moving the cam surfaces 22 downwardly against the brace 20 forcing the jaws 17 outwardly into clamping position with the wheel. After the upper rim of the wheel has been removed, the jaws 4 are moved upwardly against the tire to approximately the lower bead 5 by introducing air into the inlet 53 of the expanding fluid motor. As the jaw 4 approaches the tire, it is moved inwardly, by introducing air into inlet 41, toward the bead holding groove of the wheel. After the tip 35 passes the wheel rim it is moved inwardly so that the bead of a tire rests on surfaces 35 of the jaws 4, and the air pressure is continued into the expanding fluid motor. The expanding fluid motor moves the jaw up beyond the wheel disengaging the tire from the wheel.

The wheel, while it is mounted on the table, may be rotated or locked by moving the handle 16 to the position to permit desired direction, or where it is desired to lock the wheel against rotation, the handle 16 is placed radially outward from the table so that all the pawls contact the rack.

The modified device of Fig. 6 operates in a similar manner to the device of Fig. 1, however, the tire is placed on the table 14 and the center post 78 is passed through the hub hole of the tire to telescope with the table support 11. On introducing air into the cylinder against piston 26 the rod 25 is pulled downwardly so that the pawls 83 engage the clamp down tip 87 pulling the center post down to a position where the clamp down cone contacts and holds the wheel on the table. An adjustable tool mount may be mounted on an adjustable height center post extension 96 to provide an effective tire changing machine. The adjustable tool mount and post is the subject matter of my co-pending application, Serial No. 490,564, filed February 25, 1955, for Center Post for Tire Changer.

The fluid motors have been described for use with air since it is readily available where such machines are used, however, hydraulic or like motors may be used. The table and clamp down systems may, likewise, in various tire changing machines, and fluid motor or mechanical lever systems, be used to activate the clamp down mechanisms.

While the invention has been illustrated by reference to specific illustrations, there is no intent to limit the spirit or the scope of the invention to the precise details so described, except insofar as set forth in the following claims.

What is claimed is:

1. In a tire changing machine having a substantially horizontal wheel supporting table and a vertically slidable and removable center post having a clamp down cone arranged to contact the hub hole of a wheel, the improvement which comprises a clamp down tip secured to the inner end of said center post, said tip having an annular groove thereon, a clamp down ring, a fluid actuated motor connected to said ring, a plurality of lugs mounted on said ring and arranged to move into contact with said groove on downward movement of said ring, and means for moving said lugs into contact with said groove and for securing said lugs into holding relation with said tip whereby said clamp down cone may be moved into holding position with a wheel supported on said table.

2. In a tire changing machine having a substantially horizontal wheel supporting table and a vertically slidable and removable center post having a clamp down cone arranged to contact the edge of the hub hole of the wheel, the improvement which comprises a clamp down tip secured to the inner end of said center post, said tip having an annular groove thereon, a clamp down ring arranged to telescope with said tip, a fluid actuated motor interconnected to said ring and arranged to move the same, a plurality of lugs pivotally mounted on the internal surfaces of said ring and arranged to move into contact with said groove on downward movement of said ring, and means for pivotally moving said lugs inwardly into contact with said groove and for securing said lugs into holding relation with said tip whereby said clamp down cone may be moved into holding position within the hub of a wheel on said table.

3. In a tire changing machine of the type having a base member and a wheel holding table member mounted thereon for rotation in either direction about a central axis, the improvement which comprises a circular rack interconnected with one said member and a pawl support interconnected with the other said member and mounted adjacent to said rack, at least two pawls spacedly mounted on said pawl support and each in position to be moved into and out of engagement with said rack, each said pawl being arranged to permit table rotation in a single direction and prevent table rotation in the opposite direction when in engagement with the rack, one of said pawls permitting table rotation in one direction and the other pawl permitting table rotation in the opposite direction, and actuating means for selectively moving either said pawls into engagement with said rack so as to selectively determine the direction of the rotation of the table.

4. In a tire changing machine of the type having a base member and a wheel holding table member mounted thereon for rotation in either direction about a central axis, the improvement which comprises a circular rack interconnected and rotatable with the table member, a pawl support mounted on the base member adjacent said rack, a plurality of pawls spacedly mounted on said pawl support and each in position to be moved into and out of engagement with said rack, each said pawl being arranged to permit table rotation in a single direction and prevent table rotation in the opposite direction when in engagement with the rack, at least one of said pawls permitting table rotation in one direction and the other said pawls permitting table rotation in the opposite direction, and actuating means for selectively moving said pawls into engagement with said rack so as to selectively determine the direction of the rotation of the table.

5. In a tire changing machine of the type having a base member and a wheel holding table member mounted thereon for rotation in either direction about a central axis, the improvement which comprises a circular rack interconnected and rotatable with the table member, a pawl support mounted on the base member adjacent said rack, a system of three pawls spacedly mounted on said support and each in position to be moved into and out of engagement with the rack, each said pawl being arranged to permit table rotation in only one direction and prevent rotation in the opposite direction when in engagement with said rack, two of said pawls being arranged to be operated conjointly to permit table rotation in a direction oppositely of the other said pawl, said pawls being arranged to lock the table against rotation when all three said pawls are in engagement with said rack, and actuating means for selectively moving said two pawls into engagement with the rack for a one-way rotation of the table, for selectively and singly moving the other said pawl into engagement with the rack to permit opposite rotation of the table, and for selectively moving all three of said pawls into concurrent engagement with said rack to lock said table against rotation.

References Cited in the file of this patent

UNITED STATES PATENTS

| | | |
|---|---|---|
| 220,995 | Shedlock | Oct. 28, 1879 |
| 1,498,299 | Rollins | June 17, 1924 |
| 1,959,655 | Brouhard | May 22, 1934 |
| 2,065,644 | Bristol | Dec. 29, 1936 |
| 2,416,195 | Mitchell | Feb. 18, 1947 |
| 2,464,638 | Falkner | Mar. 15, 1949 |
| 2,471,642 | Moltz | May 31, 1949 |
| 2,513,756 | Smyser | July 4, 1950 |
| 2,534,594 | Haecker | Dec. 19, 1950 |
| 2,647,564 | Douglass | Aug. 4, 1953 |
| 2,808,860 | Hildebrant | Oct. 8, 1957 |